United States Patent Office 2,899,863
Patented Aug. 18, 1959

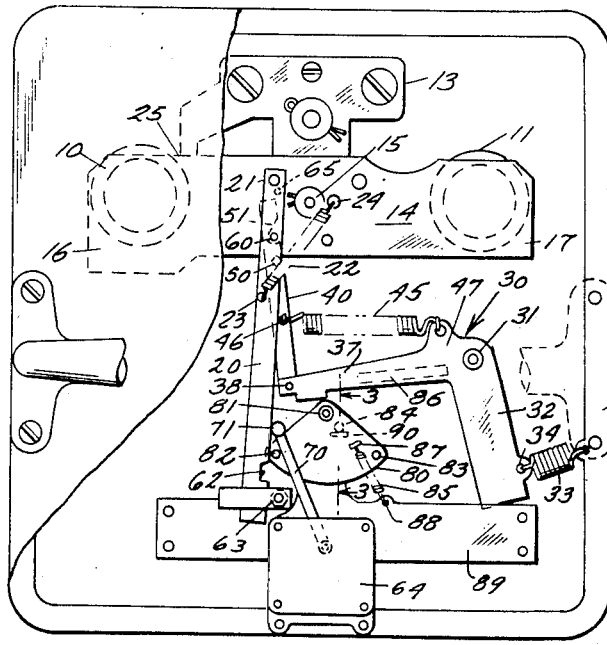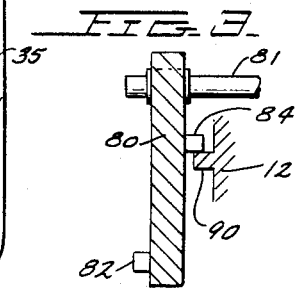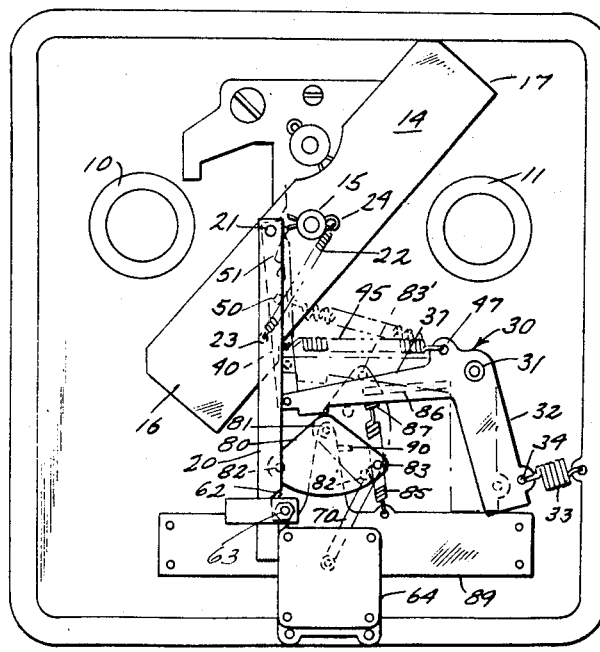

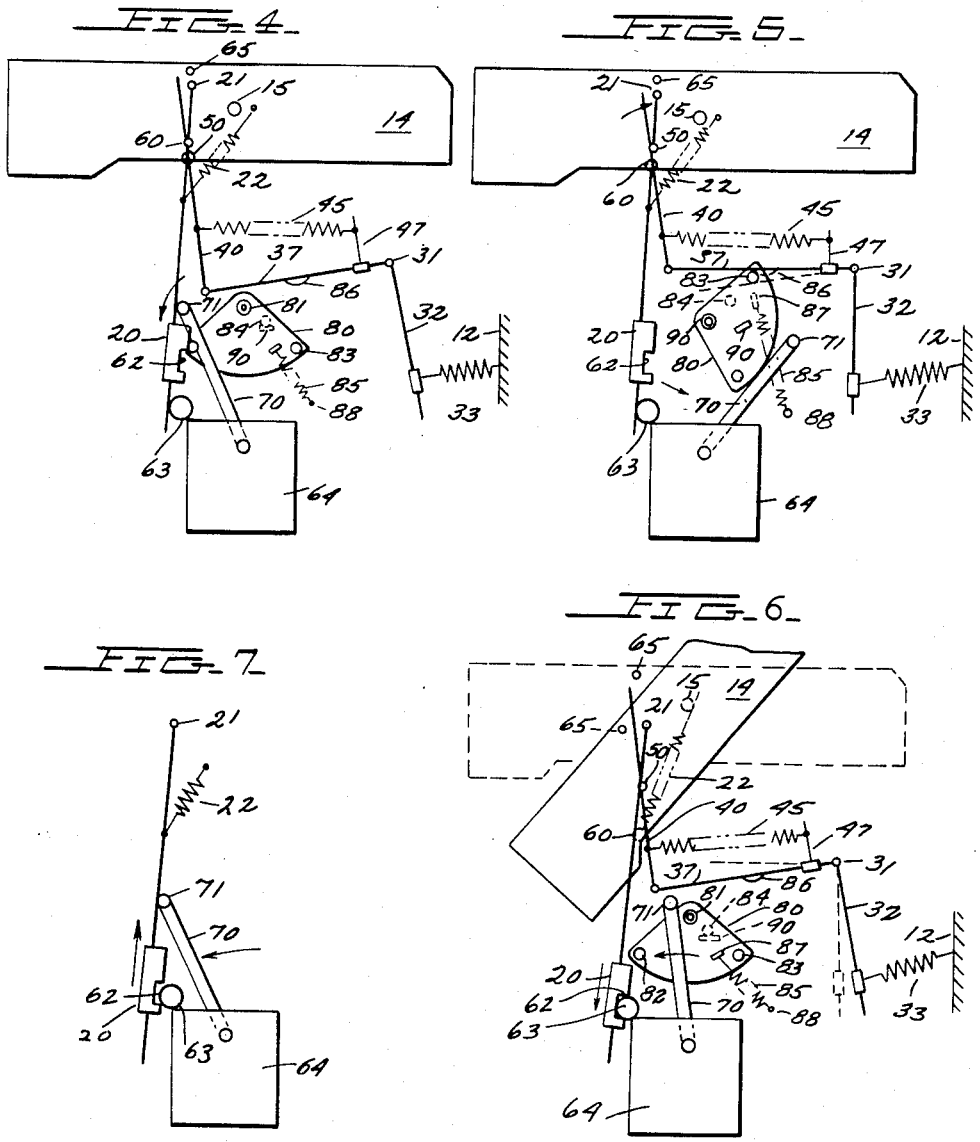

2,899,863

BINOCULAR SHUTTER CONTROL

Lawrence E. Hamilton, Daytona Beach, Fla.

Application June 25, 1958, Serial No. 744,590

7 Claims. (Cl. 88—61)

This invention relates generally to coin-operated viewing devices such as binoculars or telescopes placed at public points of interest, and more particularly relates to novel control mechanism for simplified and practical shutter operation of such devices. This invention is an improvement on my Patent No. 2,461,379 which issued on February 8, 1949 entitled "Binocular Shutter Mechanism."

In accordance with the present invention the operating handle of the optical device is arranged to be turned or swung only 90° to effect full operational control equivalent to the 360° turn of the prior art mechanism such as is exemplified by my patent referred to above. I have determined from extensive observations that many adults and children turn the control handle no more than 180°, which results in loss of the coin without resultant optical viewing. This causes business embarassment and loss of good-will.

Further, I have found that many tourists do not take the trouble or are shy to read the instructions to operate a viewing device placed outdoors. They do not wish to take the time to read them particularly while others are waiting in line. I have discovered that with my invention herein all persons will naturally swing the control handle at least the 90° requisite for full normal operation. Thus the loss of coins and good-will is avoided with my invention system.

Essentially my invention comprises a shutter pivotally mounted so that it may rotate from a position at which it intercepts the light passing through both lens systems to a position which is angularly displaced by a relatively small amount of the order of approximately 45°, where it no longer intercepts light through the double binocular system. The shutter is pivotally mounted between the lens system but may be mounted at any point where it can pivot into and out of the light path through the lens system. The shutter is combined with a simplified latch arm which automatically engages a latching element. The timing mechanism is so arranged that a lever which is displaced in one direction during the movement of the shutter to the open position will move back as regulated by the timing mechanism and then push the latching arm off the latch element to permit a simple re-setting spring to return the shutter and the latch arm to the original position.

It is accordingly an object of my present invention to provide a novel coin-operated optical viewing device.

A further object of my present invention is to provide a novel coin-operated shutter for an optical viewing device fully controllable through a lever which is turned only to the order of 90°.

Another object of my present invention is to provide a novel control mechanism for a timed coin-operated shutter of an optical device which effectuates the opening up and automatic closing of the shutter through only a 90° turn of a lever.

These and other objects of this invention will become apparent from the following description taken in connection with the drawings, in which:

Figure 1 is an elevation partly broken away showing my shutter and the associated mechanism in the closed position.

Figure 2 is a view corresponding to that of Figure 1 but showing my novel shutter mechanism in the latched open position.

Figure 3 is a cross-sectional view taken on line 3—3 of Figure 1 looking in the direction of the arrows.

Figure 4 is a schematic diagram of the shutter mechanism of Figure 1, in neutral, closed position.

Figure 5 is a schematic diagram of the shutter mechanism with the operating lever at its full 90° turn position, initiating the operating cycle.

Figure 6 is a schematic diagram of the shutter mechanism during the shutter-open or viewing condition.

Figure 7 illustrates the closing of the operating cycle.

Referring to the figures, the lens systems 10 and 11 forming the binocular viewing device are preferably constructed in Patent No. 2,131,163 and are supported in any suitable manner in a housing or case 12. A bracket 13 is also supported in any suitable manner from an interior wall of the housing or case 12. The shutter 14 is pivotally mounted on the pin 15 which in turn is supported on the bracket 13. The shutter 14 has lateral elements 16 and 17 which intercept respectively the light directed through lens systems 10 and 11.

A latch arm 20 is pivotally connected to the pin 21 on shutter 14, slightly displaced to the left of the pin 15 around which the shutter rotates. Tension spring 22 is connected between pin 23 on latch arm 20 and the head of the cotter pin 24, which assists in holding the shutter 14 on the pin 15. Tension spring 22 thus biases the latching arm 20 into counterclockwise rotation around its pivot 21; and since the upward end of tension spring 22 is on the right-hand side of the pin 15 while the lower end of the tension spring 22 is on the left-hand side of pin 15, the single tension spring 22 not only serves to bias the latch arm to latching position but also serves to raise the latch arm 20 thereby exerting an upward bias on the pin 21 which is secured to the shutter 14 and therefore tends to rotate the shutter 14 in a clockwise direction wherein the end section 16 of shutter 14 is biased upwardly against the stop 25 on bracket 13.

Thus the tension spring 22 biases the shutter to a position where, as seen in Figures 1, 4 and 5, it extends horizontally to intercept the light passing through the lens systems 10 and 11.

In order to move the shutter 14 from the horizontal position of Figures 1, 4 and 5 to the angularly displaced open position of Figures 2 and 6, it is thus necessary to overcome the bias of the spring 22. For this purpose the bell crank lever 30 rotatably mounted on the pin 31, supported by the casing 12, is provided. Bell crank lever 30 has a downwardly extending arm 32 which is connected at 34 to the tension spring 33, the opposite end of which spring is secured at 35 to the casing. This normally biases the bell crank lever 30 to rotate in a counterclockwise direction and thereby biasing the opposite or substantially horizontal arm 37 of the bell crank lever 30 to a movement in a downward direction.

The outer end 38 of the substantially horizontal arm 37 is pivotally connected to the shutter lowering arm 40. Shutter lowering arm 40 is biased into clockwise direction around its pivotal mounting on the end 38 of lever arm 37 by the tension spring 45 which is connected between the point 46 on arm 40 and lug 47 on arm 37 adjacent the pin 31.

The shutter lowering arm 40 is provided adjacent its upper end with the hook 50 and the recess 51 just above it. When therefore the arm 37 is rotated in a clockwise direction extending the tension spring 33, the shutter lowering arm 40 is raised vertically. The side of the shutter lowering arm 40 which is provided with the hook 50 and the recess 51 bears against the pin 60 on the shutter, the recess 51 being located opposite the pin 60 when the shutter is in intercepting position as in Figure 1; the pin 60 limits the degree to which the upper end of the shutter lowering arm 40 may rotate in a clockwise direction under the influence of spring 45.

When now the shutter lowering arm 40 is raised by rotation of the bell crank lever 30 to extend spring 33 by the means hereinafter described, the hook 50 snaps over the pin 60 as shown in Figure 5. When the lifting force is removed from the bell crank lever arm 37 and the shutter lowering arm 40, then the tension spring 33 will rotate the bell crank lever 30 in a counterclockwise direction to lower the arm 40 and to pull down the side 16 of the shutter 14 by reason of the engagement of the hook 50 with the pin 60, to move the elements to the position shown in Figures 2 and 6.

At this time the latching detent 62 and the latch arm 20 snaps over the latching pin 63 on the housing 64 of the timing mechanism, the latch arm 20 being biased to this latching engagement by the tension spring 22. The shutter 14 is thus held in the open position of Figures 2 and 6 by the engagement of the latching detent 62 of latching arm 20 with the latching pin 63. The shutter 14 should now be in such condition that it can return to the intercepted position of Figure 1 simply on release of the latching arm 20 from the latching pin 63.

For this purpose it is necessary that the hook 50 be released from the pin 60 and the shutter lowering arm. In order to accomplish this result, an additional pin 65 is provided on the side 16 of shutter 14, the said pin being located vertically above the pin 60 and being so arranged that when the shutter 14 rotates from the position of Figure 1 to the position of Figure 2, the pin 65 will bear against the side of the shutter lowering arm 40 to push the upper end of the arm 40 to the left where the hook 50 thereof will be pushed off the pin 60 as shown in Figures 2 and 6.

When the shutter 14 is in the raised position of Figure 1, the time operated lever 70 operated by the timing mechanism in housing 64 is in the position shown in Figures 1, 4 and 7 where it prevents engagement of the latch detent 62 of latch arm 20 with the latching pin 63. Thus it is necessary before the latching operation takes place to move the lever 70 toward the right to permit the latching detent 62 of latch arm 20 to engage pin 63.

The lever 70 is connected to the clockwork mechanism in the housing 64 so that when the lever 70 is pushed in the right, it winds up the clock mechanism which then by appropriate well-known escapement means causes lever 70 to rotate back from the position of Figures 2 and 6 to the position of Figure 1. When the lever 70 once more reaches the latch lever 20 on its return movement, then as shown in the schematic view of Figure 7, it pushes the detent 62 off the latching pin 63 to unlatch the shutter and permit the spring 22 to return the shutter and the latching arm 20 back to the positions of Figures 1 and 4.

Thus the operating mechanism must be so arranged that it will by a single operation first move the lever 70 to the right and thereafter raise the arm 37 and the bell crank lever 30 to engage the hook 50 of the shutter lowering arm 40 with the pin 51 on shutter 14. The operating means must then disengage the bell crank lever 30 so that the spring 33 which has been extended by this raising operation will be effective to rotate the bell crank lever 30 in the opposite direction to lower the shutter.

For this purpose a cam 80 is provided mounted on shaft 81 and rotatable in a counterclockwise direction with respect to Figures 1, 2 and 4 to 6. Cam 80 contains pins 82 and 83 at its corners. Pins 82, 83 are in the exemplary embodiment spaced 90° apart, although a different spacing is feasible therefore. Pin 82 is used to actuate the time operated lever 70; and pin 83, the lever 37 at projection 86. The normal or neutral position of lever 70 is as illustrated in Figures 1 and 4. The shaft 81 is provided with an appropriate handle (not shown) outside the casing 12, which handle is released in any appropriate manner as by the dropping of a coin. Any well-known coin-operated mechanism which will release the shaft 81 for its 90° turn by the viewer, may be used therefor.

When the cam 80 is rotated by the shaft 81 in the counterclockwise direction above referred to, it reaches its end position of 90° as illustrated in Figure 5 and in dotted lines in Figure 2. When this 90° position is reached pin 82 has moved lever 70 to its full timing position as seen in Figure 2, and away from the lever 20. The timing mechanism in housing 64 is now set for operation, and the lever 70 begins its return movement when cam 80 is reset as will be described. Also, pin 83, at the 90° cam 80 position, motivates lever 37 at horizontal extension 86 to lift lever 37 until hook 50 on the shutter lowering arm 40 engages the pin on shutter 14.

The excursion of the handle is stopped at its 90° turn by a suitable protuberance on the exterior of the casing in any suitable manner. Upon manual release of the handle, a spring 85 secured between a hook 87 on cam 80 and point 88 on bracket 89 promptly rotates cam 80 clockwise, returning it to its neutral position of Figures 1 and 4, as shown also in Figure 2. Cam 80 is stopped at the neutral position through a pin 84 projecting on the rear face of cam 80 abutting a stop or fixed protuberance 90 of casing 12, as shown in Figure 2.

At such position of the operating cycle tension spring 33 will be enabled to operate the shutter from the position of Figures 1 and 4 to the position of Figures 2 and 6. The elements now remain in the position of Figures 2 and 6 with the shutter 14 being retained in this position only by the engagement of latching detent 62 of the latch arm 20 with the latching pin 63.

On completion of the timing operation the lever 70 has been moved by the clockwork in housing 64 from the position of Figure 5 back to the position of Figure 7 where it now pushes the latch arm 20 off the latch pin 63 to permit spring 22 to re-set the mechanism.

Time operated lever 70 has a roller 71 at its tip to smoothly and firmly abut lever 20 for the letter's disengagement from latching pin 63. The time exposure of shutter 14 for viewing by the operator is of course determined by the timing cycle of mechanism 64 to motivate lever 70 from its extreme displacement (to the right) by pin 82 until it returns to its normal position (to the left) to disengage lever 20. Lever 70 may be "wound up" to its full (right side) position by only a 45° swing of pin 82, with pin 82 arranged to slide along lever 70 as cam 80 completes its 90° swing.

While I have herein shown my shutter as pivotally mounted between the lens systems on an axis parallel thereto for rotation in a plane normal to the axes of the lens systems, it will be obvious that my novel shutter may be pivoted above or below the lens systems, at one side of the lens systems; and may operate to pivot on an axis normal to the axes of the lens systems.

By this means my invention provides for a novel simplified automatic rotatable shutter which is latched open and then released to the closed position on completion of the timing operation. The various elements are easily accessible for maintenance, replacement and repair and the simplified construction minimizes the necessity for service in the field.

This is particularly important since viewing devices of this type are placed at many widely separated tourist points and must therefore be rugged and require a minimum of maintenance in order to be profitable in use.

In the foregoing I have described my invention solely in connection with illustrative embodiments thereof. Since many variations and modifications of my invention will now be obvious to those skilled in the art, I prefer to be bound not by the specific disclosures herein contained but only by the appended claims.

I claim:

1. In a viewing device, a lens system, a shutter pivotally mounted for rotation from a first position wherein it intercepts light passing through said lens system to a second position where the lens system is open for the passage of light; a latching arm pivotally connected to said shutter at one side of the pivotal mounting thereof; a latch element; biasing means engaging said latch arm and urging said shutter to said first position and urging said latch arm toward engagement with said latch element; means for moving said shutter from the first position to the second position, said latch arm moving therewith to a position where it engages said latch element, said means comprising a latch lowering arm; means at the end of the latch lowering arm for engaging the shutter; a member operable to move the latch lowering arm into engagement with the shutter while the shutter is in the first position; additional means for moving the latch lowering arm back to its original position to move the shutter to the second position; a time operable control arm extending to said latching arm for normally disengaging it from said latch element; a cam carrying said member; and a second member mounted on said cam predeterminedly spaced from the first said member for displacing said control arm from said latching arm when said first member is motivated towards its said engagement and for further positioning the control arm into a predetermined time phase.

2. A viewing device as claimed in claim 1, in which the said first and second members are pins projecting from said cam for respective engagement with said latch lowering arm and control arm.

3. A viewing device as claimed in claim 2, in which said pins are spaced in the order of 90° across said cam and arranged to effect the said arm engagements for operating said shutter within the order of a 90° turn of said cam.

4. A viewing device as claimed in claim 1, further including a spring connected to said cam arranged to return it to its normal neutral position upon release of the cam from a displaced position which effects said arm engagements.

5. A viewing device as claimed in claim 4, further including a pin extending from said cam arranged to abut a fixed stop to arrest the cam in its neutral position against the spring action.

6. A viewing device as claimed in claim 1, in which said members are spaced in the order of 90° across said cam and arranged to effect the said arm engagements for operating said shutter within the order of a 90° turn of said cam and further including a spring connected to said cam arranged to return it to its normal neutral position upon release of the cam from said 90° turn which effects said arm engagements.

7. A viewing device as claimed in claim 6, further including a pin extending from said cam arranged to abut a fixed stop to arrest the cam in its neutral position against the spring action.

No references cited.